United States Patent
Hohnl

[11] Patent Number: 5,245,817
[45] Date of Patent: Sep. 21, 1993

[54] MOWER BLOWER TRASH GUARD

[75] Inventor: Gary D. Hohnl, Slinger, Wis.
[73] Assignee: Deere & Company, Moline, Ill.
[21] Appl. No.: 895,301
[22] Filed: Jun. 8, 1992
[51] Int. Cl.$^5$ .................. A01D 34/66; A01D 34/82
[52] U.S. Cl. ........................ 56/13.3; 56/16.6; 56/156; 56/320.2; 384/488
[58] Field of Search .............. 56/13.3, 13.4, 12.8, 56/12.9, 320.1, 320.2, 156, 157, 16.6; 460/16, 66, 68, 69, 70; 384/484, 485, 488, 624; 415/170.1, 173.1, 173.6

[56] References Cited

U.S. PATENT DOCUMENTS

| | | | |
|---|---|---|---|
| 1,806,748 | 5/1931 | Edwards | 384/488 |
| 3,626,472 | 12/1971 | Rowland-Hill | 460/70 |
| 3,828,793 | 8/1974 | Gochanour | 460/70 |
| 4,344,442 | 8/1982 | Torland et al. | 460/116 |
| 4,433,532 | 2/1984 | McCunn | 56/320.2 |
| 4,735,037 | 4/1988 | Benter | 56/13.3 |
| 5,157,908 | 10/1992 | Sebben et al. | 56/320.2 X |

OTHER PUBLICATIONS

Deere & Company, John Deere Parts Catalog PC-2111 for "Power Flow Material Collection System and 1+2 Bag Baggers", 1 page, published in U.S.A.

Primary Examiner—Stephen J. Novosad

[57] ABSTRACT

An anti-wrap structure is provided for the bearing support of a blower fan blade carried at the edge of a multi-spindle mower deck. The blower fan shaft is supported at one end with the fan carried at its other end to facilitate improved material flow to and through the blower. On bearing support for the shaft is carried within the blower fan chamber to narrow its width and minimize the difficulty in cutting close to obstacles. Surrounding the bearing within the housing is the anti-wrap structure to protect the bearing against trash accumulation and blower clogs.

5 Claims, 5 Drawing Sheets

MOWER BLOWER TRASH GUARD

BACKGROUND OF THE INVENTION

1. Field of the Invention

The present invention relates to blowers which are used with grass mowing decks for assisting in blowing grass from the deck, through a delivery tube and to a bagger. More specifically, it relates to an anti-wrap structure to retard accumulation of trash around the blower fan shaft and bearings.

2. Description of Related Art

Multi-spindle mower decks carrying a plurality of blades are commonly utilized for mowing lawns and similar types of vegetation. These decks are capable of cutting a large swath of material as they are moved across the ground and are typically used with baggers or material collection systems.

Since the multi-spindle decks cut a large volume of material, and it must be blown through the ductwork to the collector, it is often desirable to provide a blower that can assure sufficient air and material flow to the collector. Typically, these blower assist devices are mounted either adjacent to the deck or in the tube between the deck and the collector.

When they are mounted intermediate the tube, the productivity of the fan blade can be improved since the material can be fed into the center portion of the blower fan blade to reduce clogs in the chamber the blade is housed within. Since the desired trajectory of material as it feeds into the fan blade is perpendicular to and adjacent the axis of the fan blade shaft, it has been found helpful to remove the bearing support structure for the blade shaft by cantilevering the shaft, supporting it only at the end opposite the material inlet. This reduces the shaft support structure about which material can collect and cause blockages.

When blower assists are mounted in the tube between the mower deck and the collector, however, blockages can occur within the tube leading to the blower. Therefore, it is often desirable to locate the blower assist adjacent to the mower deck to receive the material from the mower deck and propel it upwardly through the ductwork to the collector means. Locating the blower adjacent the side of the mower deck not only increases the width of the mower deck by the size of the blower structure, which can make mowing around obstacles more difficult, but it also reduces the efficiency of the fan blade since the cut material from the mower deck feeds into the fan blade below its shaft axis due to the necessity of mounting the blower low to the ground and adjacent the exit opening of the mower deck.

To improve the inlet flow of material to blowers mounted adjacent the mower deck, it has been known to cantilever the shaft supporting the fan blade so that the throat feeding the material to the fan blade from the mower deck can feed the material close to the axis of the shaft. In an attempt to also reduce the overall width of the deck and blower, the bearing which supports the cantilevered shaft has been mounted inside the housing supporting the fan blade and in the chamber within which the fan blade operates. Locating the bearing inside the fan chamber, however, has resulted in the problem of wrapping of grass, straw and other material around the bearing supporting the shaft, causing a reduction in the bearing life and increased down time for the blower.

It would, therefore, be desirable to provide a blower assist structure mounted adjacent a multi-spindle mower deck wherein that structure included a fan blade mounted in a cantilevered fashion to facilitate the desirable flow of material to the blade and with the shaft bearings located within the housing to reduce the deck and blower width. It would further be desirable to provide an anti-wrap structure that would minimize the wrapping build-up of material around the bearing which is mounted within the housing.

SUMMARY OF THE INVENTION

Accordingly, there is provided herein a blower assist structure mounted adjacent a multi-spindle deck. The blower fan blade is cantilevered and carried by bearings supporting only one end of the fan blade shaft. The fan shaft is unsupported at its blade end to enhance entry of cut material from the mower deck and eliminate material build-up around that end of the shaft.

One of the support bearings is mounted within the blower housing. Surrounding that bearing within the housing is an anti-wrap structure designed to minimize the accumulation of material around the bearing which could reduce the bearing life and increase down time of the machine for removal of wrapped material or replacement of bearings.

The anti-wrap structure includes a first sleeve-like ring supported by the housing around the bearing to insulate it against movement of grass, straw and similar material into the area where it seats on shaft. The anti-wrap structure further includes a ring projecting axially from the fan blade to overlap the sleeve-like ring and inhibit movement of the straw and similar material down and into the bearing between the fan blade and the bearing. Additionally provided on the sleevelike ring and projecting radially outwardly therefrom is a stationary divider ring that is positioned within the terminal portion of the overlap ring to inhibit axial movement of material into the space between the fan blade and the bearing.

With this structure there is provided a barrier or dam against which material that would tend to migrate between the fan blade and the housing would be prevented from wrapping around the bearing and shaft. Since the sleeve and divider ring are stationary and surround the bearing, material can not easily reach the bearing. Further, the overlapping ring carried on the fan retards entry of such material into the bearing and shaft interface.

With this structure an improved blower assist is provided for multi-spindle decks adjacent their outlet and enhanced life of the bearing is facilitated with a reduction in machine down time.

DESCRIPTION OF THE PREFERRED EMBODIMENT

Figure 1:
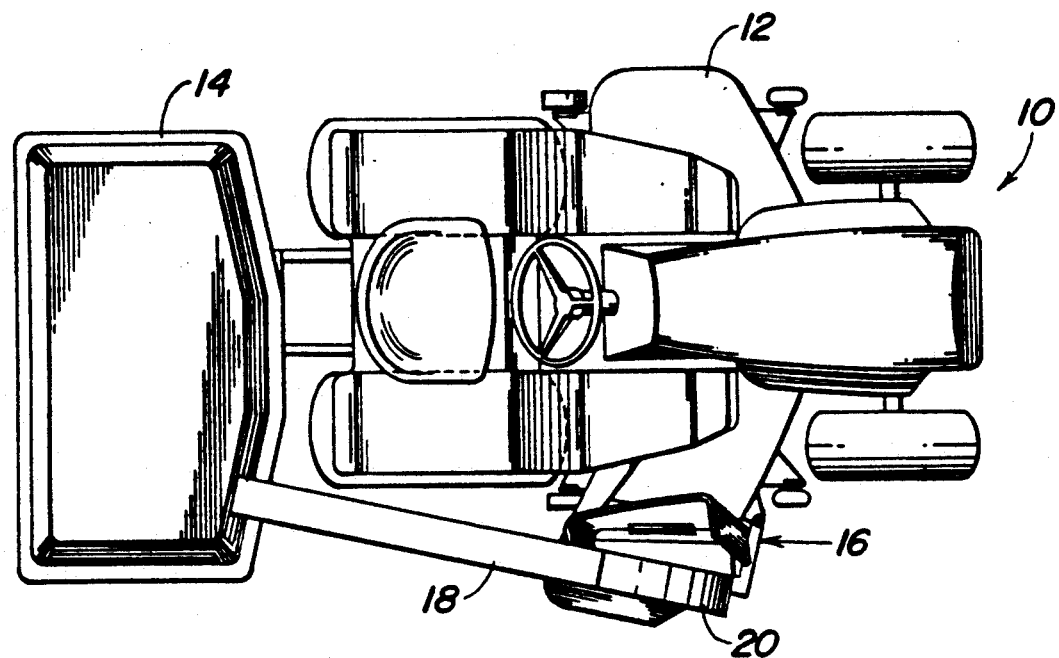
FIG. 1 illustrates a vehicle, such as a lawn and garden tractor, carrying a multi-spindle mower deck, a grass collector and a blower adjacent the deck.
Figure 2:
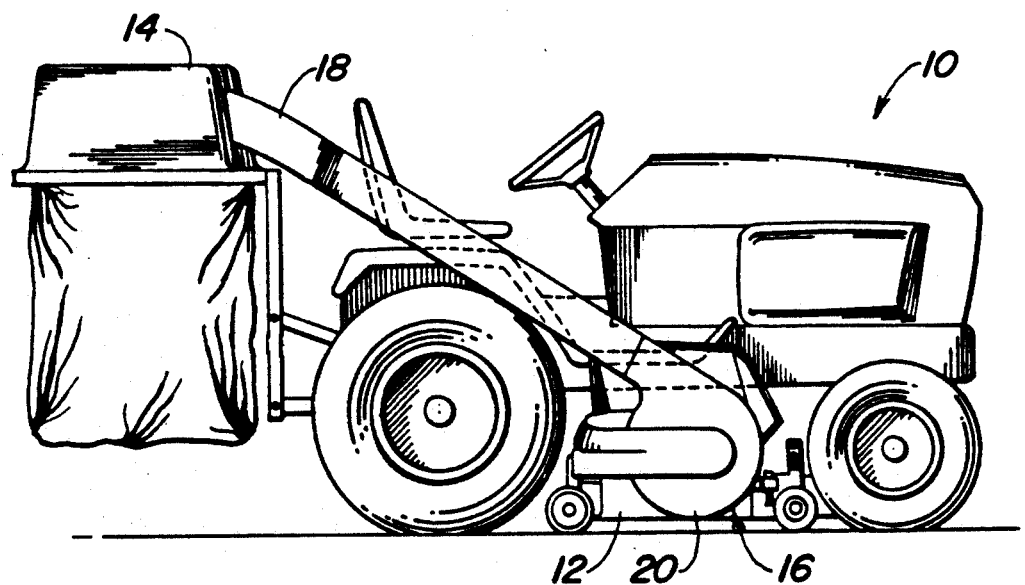
FIG. 2 illustrates in side view the structure depicted in FIG. 1.

Looking first to FIGS. 1 and 2, there is illustrated a vehicle 10, such as a lawn and garden tractor, carrying a multi-spindle mower deck 12 for cutting grass. Carried at the rear of the tractor 10 is a bagger or collection means 14 and carried adjacent the mower deck 12 is an auxiliary blower 16 for assisting in conveying cut vegetation, such as grass, through a duct means 18 and to the collector 14.

Figure 3:
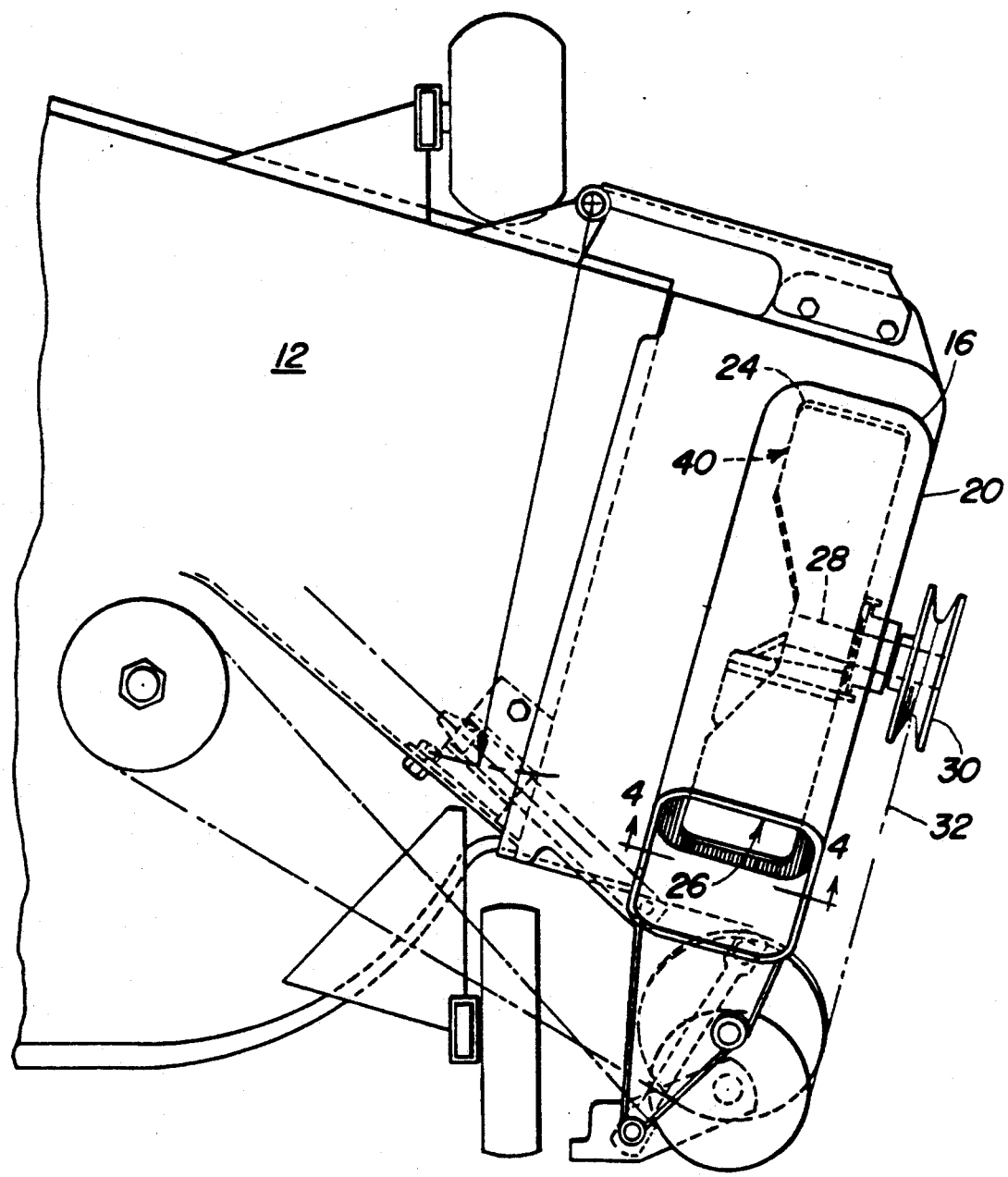
FIG. 3 illustrates an enlarged partial plan view of the blower assist structure with the fan blade and its supporting structures being shown in phantom.
Figure 4:
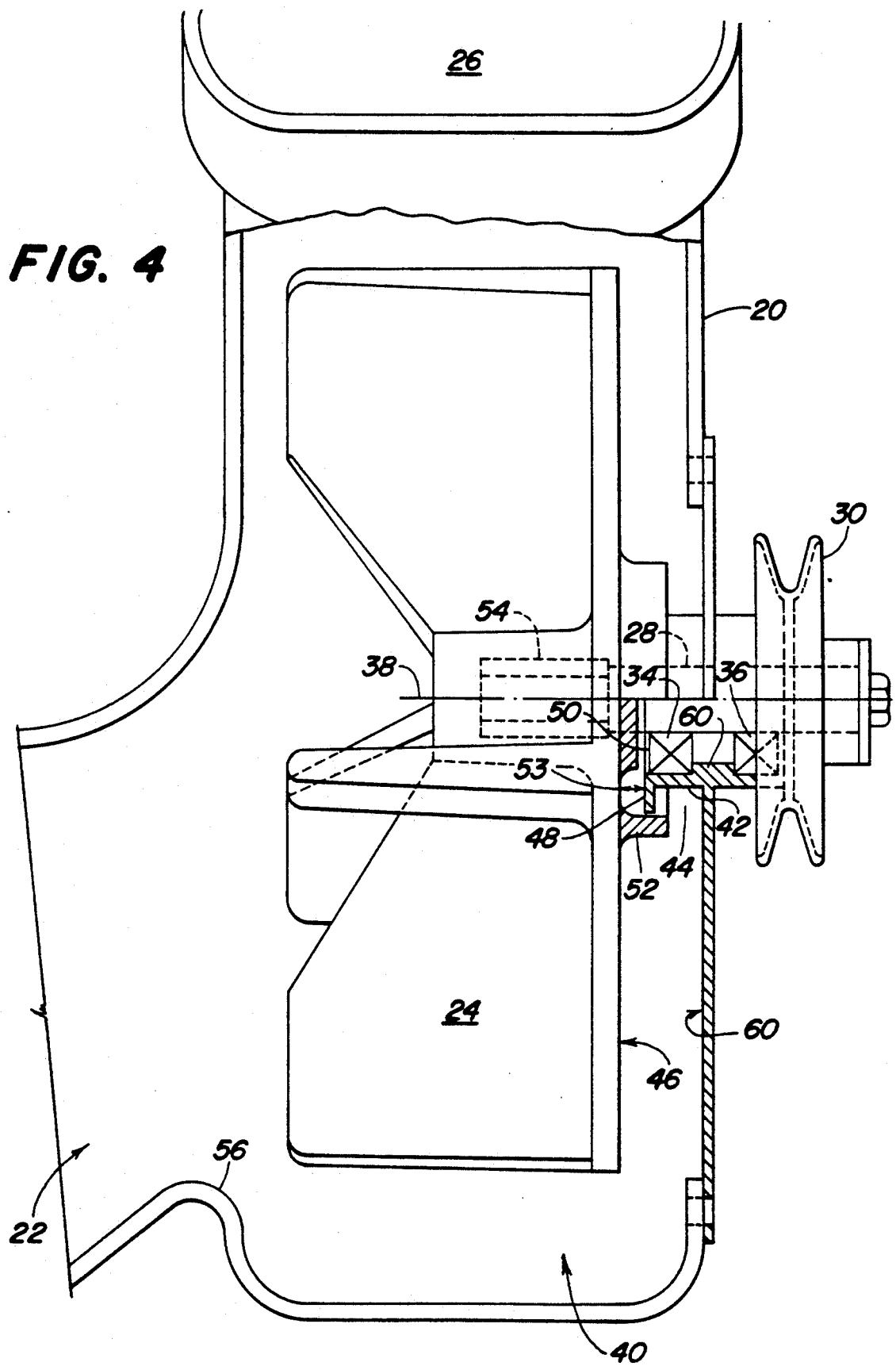
FIG. 4 illustrates an enlarged side view of the blower inlet, fan blade, shaft and the anti-wrap structure.

Looking now to FIGS. 3 and 4, we find enlarged views of the blower assist 16; FIG. 3 illustrating it in a plan view and FIG. 4 illustrating it in an end view taken along lines 4—4 of FIG. 3.

As shown in FIG. 3, the blower assist 16 is carried at the one side of the multi-spindle mower deck 12 and includes a blower housing 20 which receives material through a throat 22 (see FIG. 4) coupled with the deck 12 for movement by a fan blade 24 up and to the blower outlet 26 which is connected to the duct means 18.

Driving the fan blade shaft 28 is a pulley 30 which in turn is driven by a belt means 32 interconnected with one of the driven spindle pulleys carried on the mower deck 12. For purposes of the present invention, this drive means is not discussed in detail.

The fan blade 24 is preferably comprised of a plastic-type material which is molded to a hex-shaped shaft 28 (see FIGS. 5 and 6) that in turn is carried in a cantilevered fashion on a set of bearings 34 and 36 at one end, one set of the bearings 34 being positioned inside the blower housing 20 and one set 36 being positioned outside the blower housing 20. The shaft 28 also carries on its other end, outside of the blower housing, the pulley 30.

Figure 7:
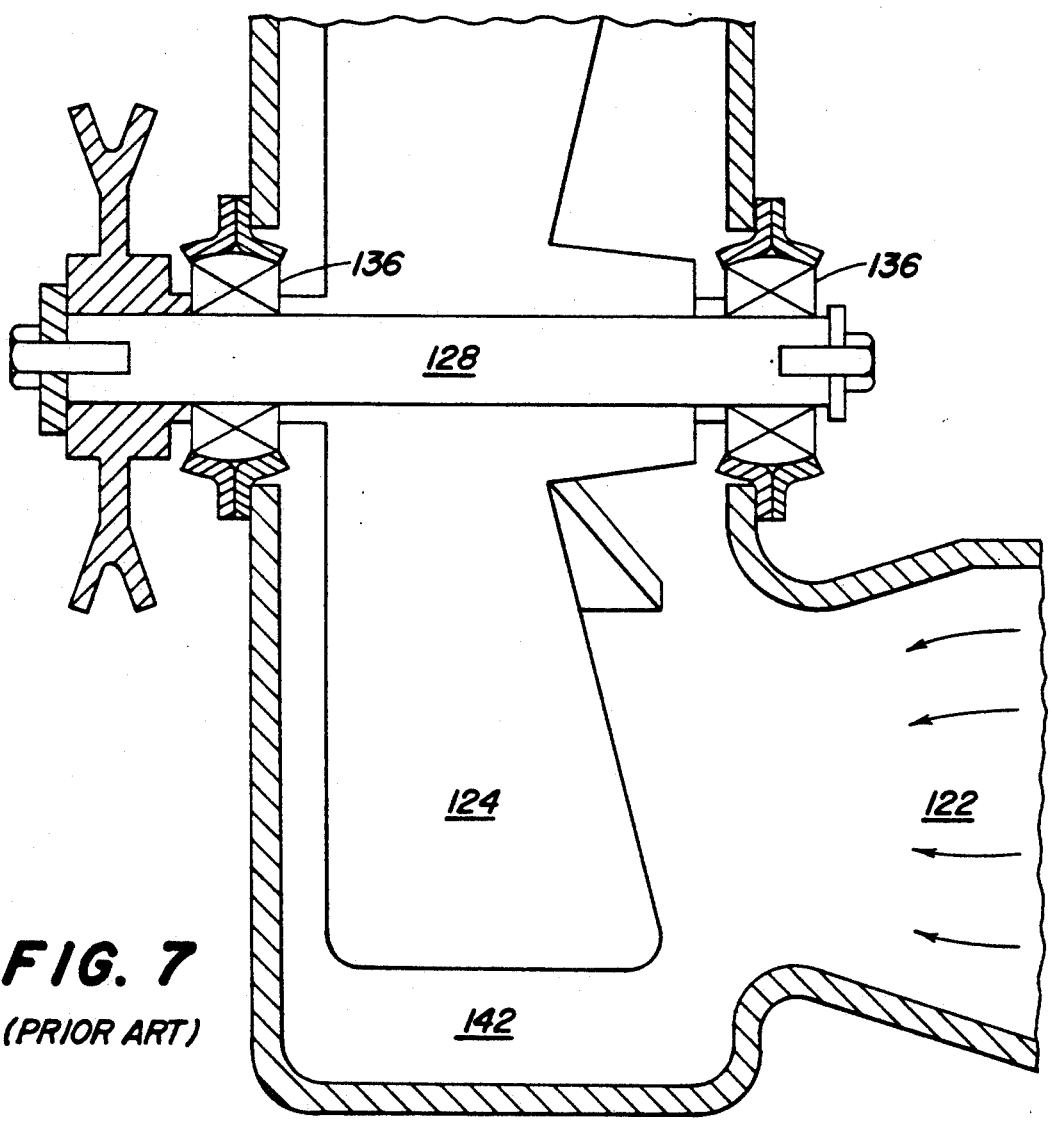
FIG. 7 illustrates a prior art blower, fan blade and housing arrangement.

The fan blade 24 is carried on the shaft 28 in a cantilevered fashion so that the blade 24 receives material from the inlet throat 38 of the mower deck 12, without the material flow being inhibited by a shaft 28 or bearing support structure as is possible with the prior art structure illustrated in FIG. 7. It is desirable to position the center of the inlet throat 22 as near as is feasible to the shaft axis 38 so that material may be received in the center area of the fan blade 24 to allow the fan blade 24 to operate at its best efficiency and reduce the likelihood of clogging as material is moved through the fan chamber 40 and to and out of the outlet 26 at the top of the housing 20. As seen in FIG. 7, prior art fan blades 124 with the inlet throat 122 at the bottom of the blade chamber 142 introduce material into the fan chamber 142 below the axis of the shaft 128. This can result in less efficient movement of material through the fan chamber 142. Further, these prior art arrangements support the shaft 128 at each of its ends, thereby positioning the bearing structure 134-136 adjacent the inlet throat 122, which can result in trash wrapping around the bearing and down time or bearing failure.

Looking again to FIG. 4, there is illustrated the fan blade 24 within the blower housing 20 and the anti-wrap structure surrounding the bearing 34. Carried by the housing 20 is a sleeve means 42 fixed to the housing 20. The sleeve means 42, which serves as one part of the anti-wrap structure, is intended to shield the bearings carried inside the housing 20 from build-up of material which could migrate down and into the bearing 34 in the space 44 between the fan blade wall 46 and the housing 20. Attached to the sleeve means 46 is a fin or divider ring 48, both the ring 48 and the sleeve means 42 being fixed to and stationary with the housing 20. The sleeve means 42 extends axially along the top outer portion of the bearing 34, while the divider ring 48 extends radially outwardly from the area adjacent the inner edge 50 of the bearing 34.

Formed as a part of and rotating with the fan blade 24 is a molded shoulder or ring 52 that projects axially outwardly from the fan blade 24 in an overlapping fashion with respect to the radial extending portion 48 of the sleeve means 42. The overlap ring 52 serves as a barrier to movement of straw, grass and other material into the space 53 between the ran blade wall 46 and the face 50 of the bearing 34.

Figure 6:
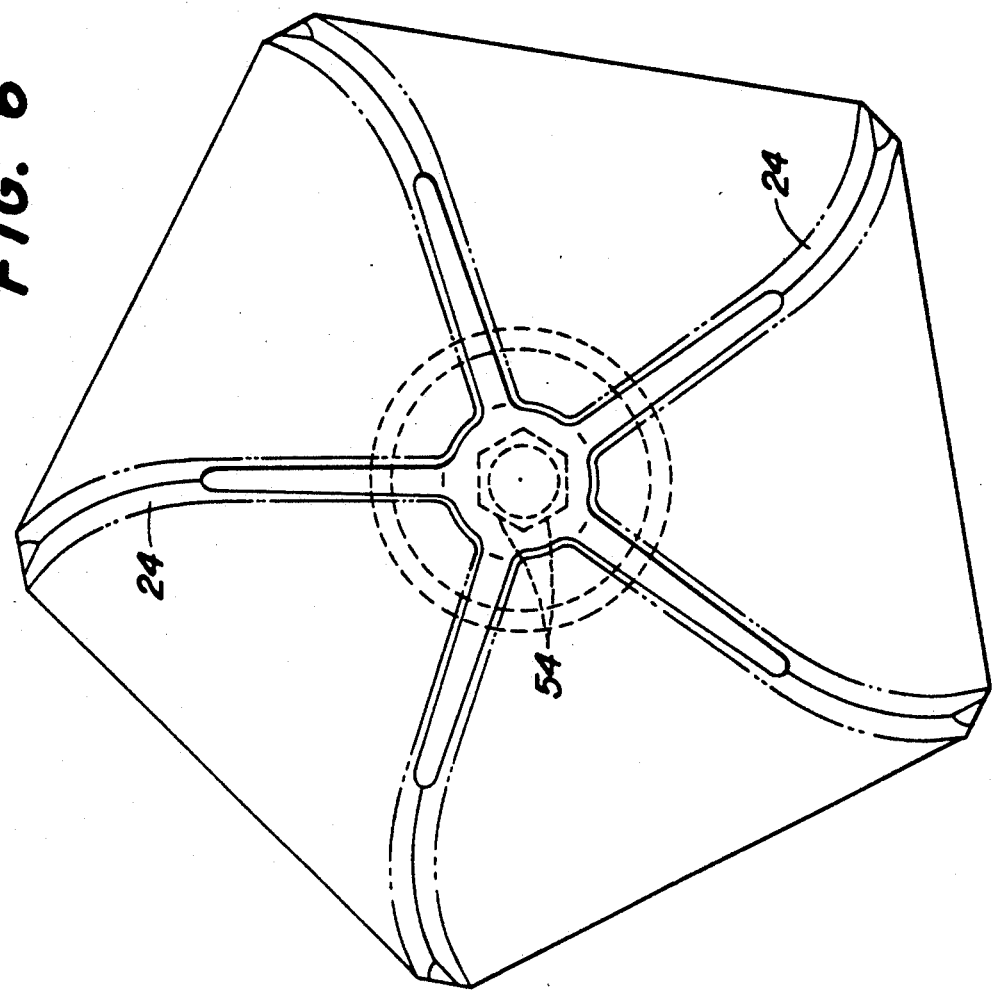
FIG. 6 illustrates the fan blade which is molded onto the shaft.
Figure 5:
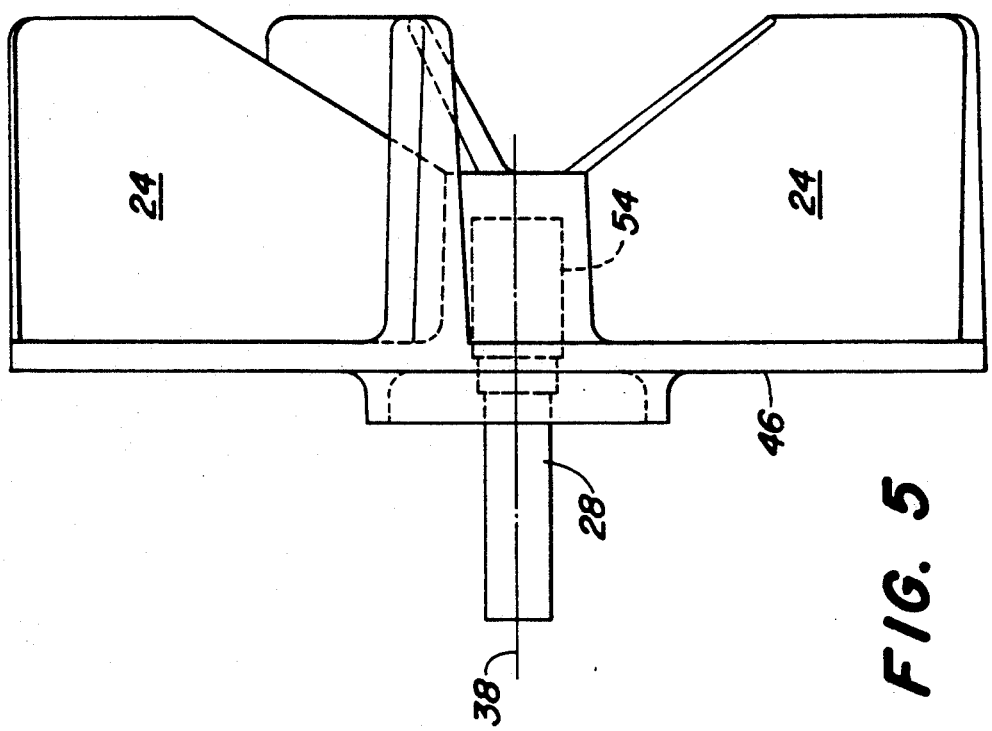
FIG. 5 illustrates a side view of the fan blade and its shaft including the shaft's flat sided configuration.

Looking now to FIGS. 5 and 6, there is illustrated the fan blade shaft 28 which includes a hex or flat portion 58. The flat segment 54 of the shaft provides a mounting or mating surface against which the molded plastic can seat and, once dried in a shape complementary to the shaft 28 and flat surface 54, eliminates the need for a keying arrangement to secure the blade 24 to the shaft 28.

In operation, the blower assist 16 is mounted adjacent to the mower deck 12 to receive material from the deck 12 and propel it rearwardly through the duct means 18 to the collector 14. Through being mounted adjacent the mower deck 12, the blower 16 can provide additional air and velocity for the material to travel through the duct and thereby minimize clogs throughout the length of the duct work.

As material enters the throat 22 (see FIG. 4) of the blower housing 20, it would enter the chamber 40 formed around the blade 24 and adjacent the inlet throat 22. The hump 56 formed by the sharp angle in the housing 20 assists in providing a separate fan chamber 40 and in effecting the desired air flow out of the chamber 40. As the material enters the chamber 22, it comes into contact with the lower portion of the blower fan blade 24 with some of the material entering in the axial center of the fan blade shaft 28. With the shaft 28 being cantilevered, no bearing is required at the inlet area as is the case with the prior art embodiment shown in FIG. 7. Accordingly, in this fashion, the efficiency of the fan blade 24 within its chamber 40 is increased and the likelihood of trash build-up adjacent the shaft 28 at the inlet 22 is reduced.

Supporting the fan blade 24 and shaft 28 for rotation are the inner and outer bearings 34 and 36 which in turn are carried by the blower housing 20 and surrounded by the sleeve means 42 which carries the divider ring 48. As material tends to migrate down and inwardly between the blade wall 50 and housing wall 60 and towards the bearing 34, the molded overlap ring 52 carried on the fan blade 24 serves to force it out towards the housing wall 60 and to the stationary reservoir or space 44 formed between the sleeve means 42, the ring 52 and housing wall 60. In this location, the material would not spin with the fan blade 24 or easily work its way into the bearing shaft interface area 53.

With the present structure there is provided a blower structure adjacent the mower deck which can facilitate enhanced movement of the material to the fan blade, through the duct and to the collector. It includes inlet throat that feeds material to the fan blade to improve fan efficiency and an anti-wrap structure carried between the fan blade bearing and housing that will minimize the build-up of material being moved through the fan chamber.

I claim:

1. An improved blower structure for use with a vehicle carrying a multi-spindle mower deck, duct means extending between the deck and a collection device attached to said vehicle, said blower structure adapted to be attached between the deck and duct means and including:

a blower housing;

a shaft carrying a fan blade;

an inlet throat in the housing for conveying material from the deck and to the fan blade, said inlet throat being generally adjacent to one end portion of the shaft and generally perpendicular to the axis of said shaft; and bearing means carried by the housing and supporting the shaft near its other end portion, said bearing means being positioned on the shaft between the blade and the housing, and anti-wrap bearing guard means on said bearing.

2. The invention defined in claim 1 wherein the housing includes a blower chamber within which the shaft and blade are rotatably supported by the bearing means, which includes a bearing carried by the housing within the chamber between the housing and the fan blade.

3. The invention defined in claim 1 wherein the bearing guard means includes sleeve means surrounding the bearing, fixed to the housing and extending generally parallel to the axis of the shaft between the housing and blade, the sleeve means further including a portion extending radially outwardly from the shaft; and ring means carried by the blade for rotation therewith, the ring means being mounted adjacent to and axially overlapping the sleeve means portion.

4. The invention defined in claim 1 wherein the shaft has at least one flat axially extending surface and the fan blade is of a plastic-type material being fixedly molded to the shaft.

5. An improved bearing guard means for use with a shaft rotatable within a bearing that is supported by a housing which extends radially away from said shaft, blade means carried by the shaft for rotation therewith, said blade means including structure extending radially from said shaft with the bearing being located on said shaft between said structure and said housing, said guard means comprising:

sleeve means surrounding said shaft and bearing, fixed to the housing and extending generally axially parallel to said shaft, the sleeve means also including a portion extending radially outwardly and away from said shaft;

said portion being spaced from the housing; and an axially extending member fixed to the structure for rotation therewith, said member spaced radially outwardly of the sleeve means portion and having an end portion generally adjacent said sleeve means portion.

* * * * *